Sept. 19, 1950

J. M. LAFFERTY

TUNABLE ULTRA HIGH FREQUENCY TUBE WITH REFLECTOR ELECTRODE

Filed June 30, 1945

2,523,031

Inventor:
James M. Lafferty,
by Merton D Morse
His Attorney.

Patented Sept. 19, 1950 2,523,031

UNITED STATES PATENT OFFICE 2,523,031

TUNABLE ULTRA HIGH FREQUENCY TUBE WITH REFLECTOR ELECTRODE

James M. Lafferty, Schenectady, N. Y., assignor to General Electric Company, a corporation of New York Application June 30, 1945, Serial No. 602,604

2 Claims. (Cl. 315—5)

Figures 1, 2:
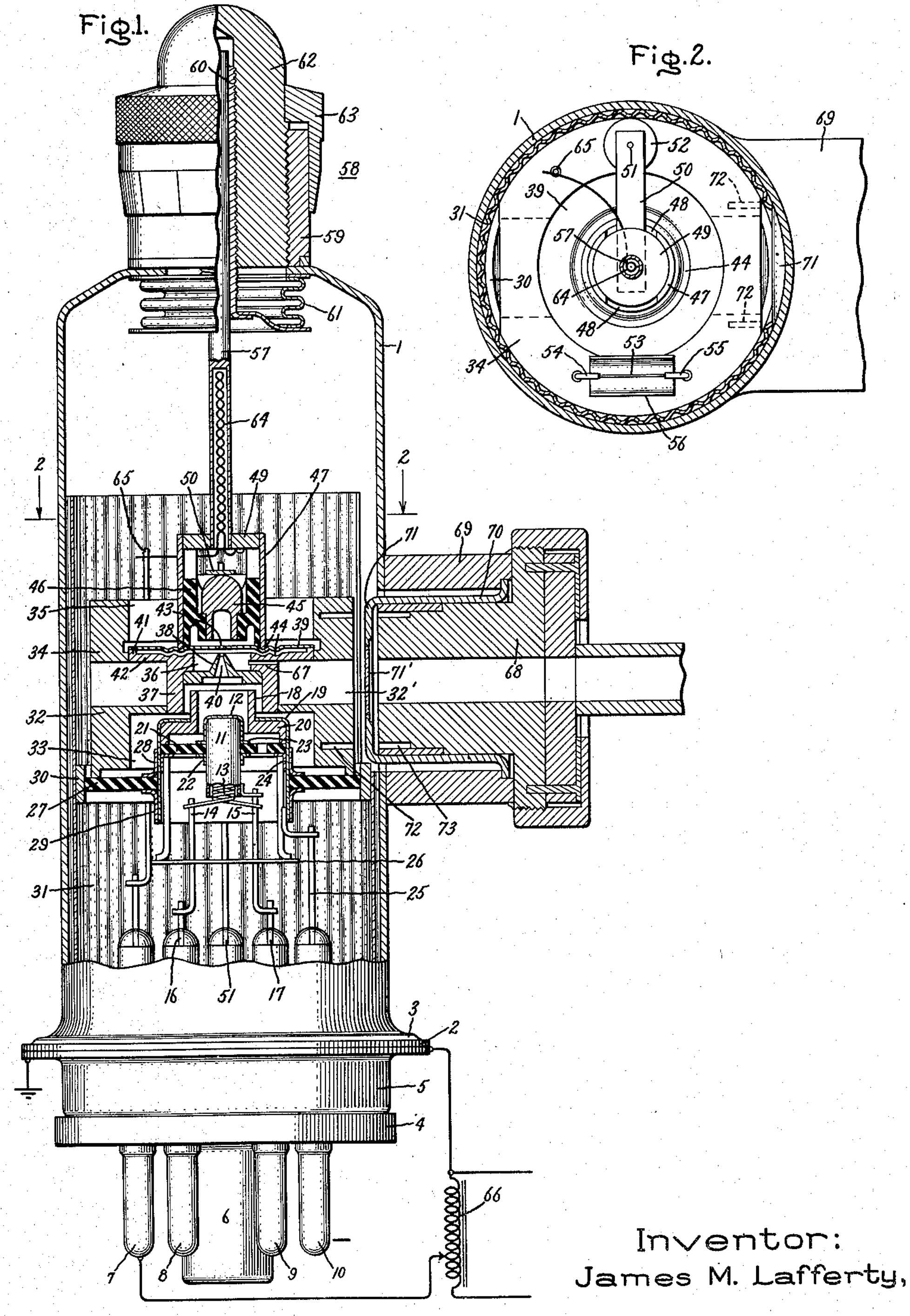

My invention relates to ultra high frequency systems and more particularly to improved tuning arrangements for space resonant structures. While not limited thereto, my invention is well adapted for tuning the cavity resonator of an electric discharge device of the velocity modulation type.

In my copending application S. N. 506,501, issued November 30, 1948 as U. S. Patent No. 2,454,970, filed October 16, 1943, entitled Ultra High Frequency Electric Discharge Device, and assigned to the assignee of the present invention, I disclosed and claimed an ultra high frequency oscillator of the reflex velocity modulation type in which a cavity resonator is employed. For the purposes of illustrating my present invention, I have shown my improved tuning arrangement embodied in a velocity modulation device of the above type.

It is an object of my invention to provide a new and improved tuning arrangement for space resonant structures.

It is another object of my invention to provide a new and improved tuning arrangement for space resonant structures which is well adapted for making initial adjustments and for varying the adjustment to compensate for variable operating conditions.

It is still another object of my invention to provide an improved tuning structure employing a combination of thermal and mechanical elements for positioning the movable element of the tuner.

It is a still further object of my invention to provide a new and improved tuning arrangement for the resonant cavity of a velocity modulation discharge device.

In accordance with the illustrated embodiment of my invention, the electric discharge device includes a space resonant cavity having opposed wall portions provided with aligned apertures. A beam of electrons passing through these apertures is modulated by the high frequency voltage appearing across the gap between the opposed apertured walls. These electrons after passing through the cavity are reversed in direction by the field produced in the region between the resonator and a reflecting electrode. The returning electrons are grouped in accordance with the velocity with which they emanated from the resonator and return through the resonator in proper phase relation with respect to the high frequency voltage of the resonator to impart energy to the electromagnetic field of the resonator. In this way the resonator is maintained in a state of oscillation and high frequency energy may be extracted from the resonator in any suitable way. In order to control the operating frequency of the discharge device, one wall of the resonator is formed as a flexible diaphragm. In accordance with an important aspect of my invention, the position of this diaphragm is controlled by a tuning structure including a motion-transmitting means including an elongated rod. This rod is made hollow to receive a heating element which may be variably heated in accordance with some operating condition in response to which it is desired to control the frequency of the device. With this simple and compact arrangement, both mechanical and thermal tuning are possible. In the illustrated embodiment, the reflecting electrode is moved by the tuning structure so that its relative position between the reflecting electrode and the movable wall of the resonator remains constant.

For a better understanding of my invention reference may be had to the following description taken in connection with the accompanying drawing, and its scope will be pointed out in the appended claims. In the drawing, Fig. 1 is a longitudinal view, partly in section, of an electric discharge device embodying my invention, and Fig. 2 is a cross sectional view, taken along the line 2—2 of Fig. 1.

Referring to Fig. 1, my invention is there illustrated as applied to an ultra high frequency electron discharge device comprising an enclosing envelope 1, preferably of rigid construction, comprising a metal having a low coefficient of thermal expansion such as Invar, and which defines at least in part an evacuated space in which are positioned various elements and electrodes described hereinafter. The envelope 1 is supported by and sealed to a header 2 which comprises a flanged metallic part to which the lower part of the envelope 1 is secured by a suitable sealing means, such as by a solder 3. A mounting base 4 of insulating material is supported from the header by a flanged mounting ring 5. As is well understood, the base is provided with a positioning hub 6 around which are located the terminal prongs of the tube. Eight prongs are provided but only four are visible in the drawing and these are designated by numerals 7–10 inclusive.

Within the envelope 1 and preferably centrally located near the lower part of the defined space, I provide a thermionic cathode which may be of the indirectly heated type comprising a metallic cylinder 11 closed at its upper end by a cup-like member 12 which is preferably coated with an electron emissive material, such as an alkaline earth metal, to serve as a source of electrons. A filament or heating element 13 is centrally positioned within the cylinder 11 and is supplied with energizing current through a pair of conductors 14, 15, conductor 14 being connected between one end of filament 13 and a lead-in conductor 16 and conductor 15 being connected to a lead-in conductor 17. Conductor 15 is likewise connected to the outer surface of the metallic cylinder 11 at its lower extremity to tioned within this recess. After the resonator is so positioned the two portions of the anode structure are soldered together to form an integral structure.

The cavity resonator 36 is defined by a tubular metallic cylinder member 37 which passes through a centrally located aperture in the block 32, a conical member 38, and a flexible diaphragm 39. The conical part 38 defines a tapered aperture 40 through which the electron beam passes. The flexible metallic diaphragm 39, which provides a means for controlling the natural frequency of the resonant cavity 36 is seated upon a circular gated rod-like member 57 which is supported from the envelope by a differential motion device designated by the numeral 58. The device 58 includes an internally threaded sleeve 59 supported from the end wall of the envelope about an aperture and an externally threaded sleeve 60 of smaller diameter which is positioned on the rod 57 and sealed thereto at its upper end. The lower end of the sleeve 60 is sealed to the envelope by a resilient structure including a bellows 61. Relative movement between the envelope and the rod 57 is produced by an annular member 62 having threaded inner and outer surfaces engaging, respectively, with the sleeves 60 and 59. The member 62 is provided with a skirt 63 which overhangs the sleeve 59 and provides a suitable surface for manually adjusting the position of the member 62 and resultant position of the rod 57 and diaphragm 39. The pitches of the threads on the inner and outer surfaces of member 62 are different and if designated by $p$ and $p'$, the resultant motion of rod 57 for $n$ turns of the member 62 is $$n\left(\frac{1}{p}-\frac{1}{p'}\right)$$

It is apparent as $p$ and $p'$ approach equality the motion of 57 per turns of member 62 decreases. The structure thus far described provides for mechanically adjusting the position of the diaphragm and the operating frequency of the device. In accordance with my invention means are also provided for adjusting or controlling the position of the diaphragm 39 in response to the heating effects produced by currents passed through a heater element 64 received within the hollow rod 57. As illustrated, one terminal of the heater element is connected with the disk 49 which is directly connected with the envelope, and the other terminal is connected with a lead-in conductor 65 which is sealed through the header of the device and connected with terminal prong 7. Thus the heater element may be energized in accordance with a voltage impressed between the terminal prongs 7 and the envelope of the tube. This voltage may be varied to produce any desired frequency control and, if desired, may be energized by the output of an automatic frequency control circuit to adjust properly the position of the diaphragm 39 to maintain the operating frequency of the device constant. In the drawing I have illustrated an adjustable voltage device 66 connected with the prong 7 and the tube envelope to energize the heater element 64. Thus the structure of my invention provides a simple and compact tuning structure which renders it possible to effect an initial position of the diaphragm 39 in accordance with the desired operating frequency which may be thereafter automatically maintained by controlling the temperature of the rod 57. While many materials may be employed for the rod 57, proper consideration being given to the thermal characteristics of the material with respect to the remainder of the structure and to the dimensions chosen, I have found that a stainless steel rod used in conjunction with an Invar envelope provides a very satisfactory combination.

In the embodiment illustrated in the drawing a waveguide output circuit is provided in accordance with the invention described and claimed in my copending application S. N. 600,908 filed June 22, 1945, issued May 16, 1950 as U. S. Patent No. 2,508,346 and assigned to the assignee of the present invention. As illustrated in the drawing, a rectangular section of waveguide including a rectangular passage 32′ is formed by a channel in the anode member 32 and a cooperating surface of anode member 34. This passage communicates with the resonant cavity by a small slot 67. This waveguide section is coupled to a waveguide section defined by the member 68 supported from a sleeve 69 surrounding an aperture in the side wall of the envelope 1. The sleeve 69 also supports a cup-like member 70 having an end wall 71 lying substantially in the plane of the envelope wall and provided with a dielectric window 71′ in alignment with the passages of the internal and external waveguide sections. Suitable half-wave-length filters are provided by annular slots 72 and 73 formed in the opposed ends of the waveguide sections positioned on opposite sides of the dielectric window 71′. A more detailed description of the output waveguide structure and theory of operation may be had by reference to my above-mentioned copending application. As will be readily understood, high frequency energy extracted from the cavity resonator 36 may be propagated along the waveguide including the passage 32′ and the passage defined by the member 68.

In considering the operation of the embodiment of my invention described above, it may be stated generally that the electron discharge device is of the velocity modulation type wherein an electron beam is velocity modulated periodically so that successive groups of electrons are alternately accelerated and decelerated tending to group the electrons in the beam after the beam has traversed the velocity modulation gap between the aperture 40 and the diaphragm 39. The particular form of electron discharge device described above operates in accordance with reflex principles. After undergoing velocity modulations, the electrons are given an opportunity to assume a charge density distribution incident to the effect of the velocity modulation and are reversed in the direction of travel to re-enter the cavity resonator delivering energy to the electromagnetic fields thereof and through the output aperture 67 to the waveguide 32′. In the device described above, an electron beam is established by virtue of the unidirectional potential impressed between the anode structure including the blocks 32 and 34 which are maintained at the potential of the envelope 1 and the cathode cylinder 11. The electrons of the beam initially assume a velocity determined by the differences in potential impressed between the anode and cathode. Negative potential is supplied to the focussing cylinder 18 which tends to restrict the size of the electron beam, confining it to a relatively small area in order that a large percentage of the electrons pass through the cavity resonator 36, entering through the aperture 40 of conical part 38 and leaving through the aperture of the diaphragm 39. Assuming an excitation of the cavity resonator 36 by virtue of sporadic motion of electrons across the gap during starting operation, the resonator is set into an oscillation and there is established across the modulating gap, between the upper edge of the conical part 38 and the diaphragm 39, an alternating high frequency potential incident to the electromagnetic field within the cavity resonator. By virtue of the alternating nature of this potential, electrons passing through the resonator during periods of time when the diaphragm 39 is positive with respect to the conical part 38 are undergoing an acceleration. Consequently, the electrons, after passing through the resonator 36, proceed into the region of the field produced by the reflecting electrode 45 which, preferably, is maintained at a negative potential with respect to the cathode. The distance which the electrons proceed in their paths beyond the diaphragm 39 is a function of the kinetic energy of each electron. It is well understood that the energy of an electron may be referred to a voltage which will accelerate the electron to a particular velocity, establishing that amount of kinetic energy. The faster electrons obviously travel further toward the reflecting electrode before they are stopped and reversed than do the slower electrons. With the configuration of the reflecting electrode 45 illustraded and the proper relation between the voltage of the reflecting electrode and the remaining electrodes of the system, it is possible to bunch the returning electrodes and have them pass through the resonator in proper phase relation to deliver energy to the electromagnetic field of the resonator so that energy may be delivered to the output circuit including the waveguide of member 68.

While the potential of the reflecting electrode has some effect on the operating frequency of the device, primary frequency control is accomplished by the position of the diaphragm 39. In the illustrated embodiment, the initial position of the diaphragm may be determined by operation of thumbscrew 63 to move the rod 57. This changes the position of diaphragm 39 and as a result the initial frequency of the resonator. In addition, for a given position of the sleeve 60 and upper end of rod 57, the position of diaphragm 39 may be controlled by controlling the temperature of the rod 57. This may be accomplished by controlling the energization of the heater element 64 positioned within the rod 57. As previously stated, this may be done in response to the output of an automatic frequency control system so that the operating frequency of the device is maintained constant regardless of temperature or other variations which tend to influence the frequency. The energization of the winding 64 may also be accomplished at a remote point by manual control, if desired. It is apparent from the foregoing description that my invention provides a compact and simple combination mechanical and thermal tuning arrangement which is well adapted for making an initial adjustment of frequency and for thereafter automatically maintaining or modulating that frequency.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. A high frequency electrical discharge device of the velocity modulation type comprising a cavity resonator including oppositely located walls one of which is movable, said walls each having an aperture therein, a reflecting electrode positioned opposite the aperture in said movable wall, a cathode located on the opposite side of said resonator opposite the aperture in the other of said walls, an envelope for said device enclosing said resonator, an operating member, means connecting said operating member with said reflecting electrode and said movable wall to move said wall and reflecting electrode simultaneously, and means supported on said envelope and engaging said member for adjusting the position of said reflecting electrode and wall to control the operating frequency of said device.

2. A high frequency electrical discharge device of the velocity modulation type comprising a cavity resonator including oppositely located walls one of which is movable, said walls each having an aperture therein, a reflecting electrode positioned opposite the aperture in said movable wall, a cathode located on the opposite side of said resonator opposite the aperture in the other of said walls, an envelope for said device enclosing said resonator, an operating member, means connecting said operating member with said reflecting electrode and said movable wall to move said wall and reflecting electrode simultaneously, means supported on said envelope and engaging said member for adjusting the position of said reflecting electrode and wall to tune said resonator, and heating means adjacent said operating member for varying the temperature of said member to control the tuning of said resonator independently of said last mentioned means.

JAMES M. LAFFERTY.

REFERENCES CITED

The following references are of record in the file of this patent:

UNITED STATES PATENTS

| Number | Name | Date |
|---|---|---|
| 1,559,714 | Lilienfeld | Nov. 3, 1925 |
| 2,242,275 | Varian | May 20, 1941 |
| 2,408,817 | Snow | Oct. 8, 1946 |
| 2,414,496 | Varian | Jan. 21, 1947 |
| 2,414,785 | Harrison et al. | Jan. 21, 1947 |

FOREIGN PATENTS

| Number | Country | Date |
|---|---|---|
| 595,247 | Great Britain | May 20, 1944 |